(12) United States Patent
Sejima et al.

(10) Patent No.: US 9,377,162 B2
(45) Date of Patent: Jun. 28, 2016

(54) PRESSURE VESSEL LINER, MOLDING DIE THEREOF, AND PRESSURE VESSEL

(71) Applicants: TOYODA GOSEI CO., LTD., Kiyosu-shi, Aichi-ken (JP); TOYOTA JIDOSHA KABUSHIKI KAISHA, Toyota-shi, Aichi-ken (JP)

(72) Inventors: Eizaburo Sejima, Kiyosu (JP); Yasushi Tashiro, Kiyosu (JP); Takenori Aiyama, Toyota (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/253,002

(22) Filed: Apr. 15, 2014

(65) Prior Publication Data

US 2014/0312043 A1    Oct. 23, 2014

(30) Foreign Application Priority Data

Apr. 17, 2013 (JP) .................................. 2013-086225
Mar. 27, 2014 (JP) .................................. 2014-065916

(51) Int. Cl.
*F17C 1/16*      (2006.01)
*F17C 13/00*     (2006.01)
(Continued)

(52) U.S. Cl.
CPC ............... *F17C 1/16* (2013.01); *B29C 45/0025* (2013.01); *B29C 45/0046* (2013.01); *F17C 13/002* (2013.01); *B29C 2045/0027* (2013.01); *B29L 2031/7156* (2013.01); *F17C 2201/0109* (2013.01); *F17C 2201/056* (2013.01); *F17C 2201/058* (2013.01); *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2205/0397* (2013.01); *F17C 2209/2109* (2013.01); *F17C 2209/221* (2013.01); *F17C 2221/012* (2013.01); *F17C 2221/033* (2013.01);
(Continued)

(58) Field of Classification Search
CPC .. F17C 1/16; F17C 13/002; F17C 2201/0109; F17C 2203/0604; F17C 2209/23; F17C 2209/232; F17C 2260/011; F17C 2205/0305; F17C 2209/2118; B29C 2045/0027; B29C 45/0025; B29C 45/0046
USPC ........................................................ 220/586
See application file for complete search history.

(56) References Cited

U.S. PATENT DOCUMENTS 1,591,058 A * 7/1926 Schwartz ....................... 285/202
5,839,600 A * 11/1998 Moreira et al. ........... 220/560.04
(Continued)

FOREIGN PATENT DOCUMENTS

JP    2010-077995 A    4/2010
JP    2012-225373 A    11/2012

*Primary Examiner* — Jeffrey Allen
*Assistant Examiner* — Jennifer Castriotta
(74) *Attorney, Agent, or Firm* — Posz Law Group, PLC

(57) ABSTRACT

The present invention provides a technique for suppressing an occurrence of weld in a pressure vessel liner. A film gate for molding a pressure vessel liner is located on a radially outer side of an outer peripheral end portion of an meshing portion in the pressure vessel liner. By disposing the film gate on the radially outer side of the meshing portion with a sufficient space between, it is possible to control the flow rate of the molten resin during molding, thereby suppressing an occurrence of weld.

13 Claims, 12 Drawing Sheets

(51) Int. Cl.
*B29C 45/00* (2006.01)
*B29L 31/00* (2006.01)

(52) U.S. Cl.
CPC .. *F17C 2221/035* (2013.01); *F17C 2223/0123* (2013.01); *F17C 2223/0153* (2013.01); *F17C 2223/0161* (2013.01); *F17C 2223/033* (2013.01); *F17C 2223/036* (2013.01); *F17C 2260/013* (2013.01); *F17C 2270/0168* (2013.01); *Y02E 60/321* (2013.01)

(56) References Cited

U.S. PATENT DOCUMENTS

| | | | | |
|---|---|---|---|---|
| 8,523,002 | B2* | 9/2013 | Strack et al. | 220/592 |
| 2002/0150746 | A1* | 10/2002 | Ono et al. | 428/292.1 |
| 2011/0303681 | A1* | 12/2011 | Newhouse et al. | 220/581 |
| 2013/0105501 | A1* | 5/2013 | Vanswijgenhoven et al. | 220/660 |

\* cited by examiner

PRESSURE VESSEL LINER, MOLDING DIE THEREOF, AND PRESSURE VESSEL

CROSS REFERENCE TO RELATED APPLICATIONS

The present application claims priority from Japanese patent applications Nos. JP 2013-086225 filed in Japan on Apr. 17, 2013 and JP 2014-065916 filed in Japan on Mar. 27, 2014, the entirety of both disclosures of which are hereby incorporated by reference into this application.

TECHNICAL FIELD

The present invention relates to a resin liner used in a pressure vessel into which various pressurized materials are filled, a molding die for manufacturing the liner, and a pressure vessel including the liner.

BACKGROUND ART

As pressurized materials to be filled into a pressure vessel, various compressed gases such as a high-pressure hydrogen and a compressed natural gas (CNG), various liquefied gases such as a liquid hydrogen, a liquefied natural gas (LNG), a liquefied petroleum gas (LPG) and the like are exemplified.

As a pressure vessel into which the various pressurized materials are filled, in general, one including a hollow container main body, a metallic mouthpiece portion attached to the container main body, and a valve attached to the mouthpiece portion is used. In the pressure vessel of this type, in general, an inner peripheral surface of the container main body is made up of a resin liner, and an outer peripheral surface of the liner is covered with a reinforcing portion made of a high-strength resin (such as fiber reinforced plastic: FRP).

The pressure vessel including the liner requires strength capable of withstanding filling of the high-pressure gas. Furthermore, in order to obtain a liner having excellent strength, it is considered that there is a need to reduce weld formed on the liner. The weld is considered to be likely to occur during molding when a flow path of the molten resin branches off and then the branched paths join with each other again. When the flow path of the molten resin branches off, a flow rate and a temperature of the molten resin are highly likely to be different for each of the branched paths. In such a case, it is hard to uniformly mix the joined molten resin. Therefore, in the obtained molded article, it is considered that resin regions adjacent to each other on a boundary of a weld line are in a state of being welded to each other.

Therefore, in a molded article in which weld occurs, it is considered that strength in the vicinity of the weld line is lower than that in the other portions. Because a liner is required to have high strength as described above, there is a need for a liner in which weld is hard to occur, and also a technique capable of molding a liner while suppressing an occurrence of weld.

It is considered that in order to suppress an occurrence of weld, it is effective to reduce branching off and joining of a molten resin in a cavity of a molding die. As technique of reducing branching off and joining of a molten resin in a cavity to suppress an occurrence of weld, molding a liner using a molding die having a film gate has been known (e.g., refer to Patent Literature 1). However, depending on the shape of the liner, it has not been possible to sufficiently suppress an occurrence of weld even when using the technique introduced in Patent Literature 1. For this reason, development of a technique to more effectively reduce an occurrence of weld is desired.

CITATION LIST

Patent Literature

Patent Literature 1: JP 2010-77995 A

SUMMARY OF INVENTION

Technical Problem

The invention has been made in view of the above circumstances, and an object thereof is to provide a technique of reducing an occurrence of weld in a liner of a pressure vessel.

Solution to Problem

A pressure vessel liner of the invention for solving the above-described problems includes:

a resin liner main body portion of a bottomed cylindrical shape which has bottom portions at two axial end portions and in which at least one bottom portion has an opening portion for a mouthpiece to be inserted;

an meshing portion that is integrally formed on an axially outer surface of each of the bottom portions, is disposed on a peripheral edge of the opening portion, and includes a convex portion projecting toward an axially outer side and a radially inner side of the liner main body portion and a concave portion connected to the convex portion; and a gate portion that is a trace of a film gate formed during molding, and is disposed on the radially outer side of the outer peripheral end portion of the meshing portion, wherein:

in the resin linear main body portion, a peripheral edge portion of each of the bottom portions on a radially outer side forms a dome shape smoothly connected to a peripheral wall of the liner main body portion, and the bottom portions are depressed axially inward with respect to the peripheral edge portion; and in the meshing portion, the convex portion and the concave potion are alternately arranged along a circumferential direction of the liner main body portion, a radially outer end portion of the convex portion and a radially outer end portion of the concave portion constitute an outer peripheral end portion continuous in the circumferential direction, and a projection length of the concave portion from the outer peripheral end portion to the radially inner side is shorter than a projection length of the convex portion from the outer peripheral end portion to the radially inner side.

The pressure vessel liner of the invention is preferably further provided with any one of the following (1) to (4), and more preferably is provided with a plurality thereof.

(1) The radial length from the gate portion to the inner peripheral end portion of the concave portion may be equal to or greater than the axial length of the inner peripheral end surface of the concave portion.

(2) The radial length from the gate portion to the inner peripheral end portion of the concave portion may be 5 mm or more.

(3) At least apart of the gate portion may be raised with respect to a virtual curved surface that smoothly connects an axially outer end surface of the convex portion and an outer surface of the peripheral wall of the liner main body portion.

(4) At least a part of the gate portion may be flush with a virtual curved surface that smoothly connects the axially outer end surface of the convex portion and the outer surface of the peripheral wall of the liner main body portion.

Furthermore, as a molding die for solving the above-described problems, there is provided a molding die for molding the above-described pressure vessel liner of the invention, the molding die including:

a liner die surface configured to define a cavity for molding the pressure vessel liner, and a gate die surface configured to define a cavity for molding the film gate, wherein the gate die surface is disposed on the radially outer side of a region for molding an outer peripheral end portion of the meshing portion on the liner die surface.

The pressure vessel liner of the invention is preferably provided with any one of the following (5) to (7), and is more preferably provided with a plurality thereof.

(5) A radial length from the gate die surface to the region for molding the inner peripheral end portion of the concave portion on the liner die surface may be equal to or greater than an axial length of the region for molding the inner peripheral end surface of the concave portion.

(6) The radial length from the gate die surface to the region for molding the inner peripheral end portion of the concave portion on the liner die surface may be 5 mm or more.

(7) A distance between a virtual curved surface and a region for molding a proximal end portion of the gate portion in the gate die surface may be greater than 0 mm and equal to or less than 1 mm, the virtual curved surface smoothly connecting a region for molding an axial outer end surface of the convex portion in the liner die surface and a region for molding an outer surface of the peripheral wall of the liner main body portion in the liner die surface.

The pressure vessel for solving the above-described problems includes any one of the above-described the pressure vessel liners, and a mouthpiece of a cylindrical shape that is inserted into the opening portion of the pressure vessel liner and is meshed with the meshing portion.

Advantageous Effects of Invention

According to the pressure vessel liner of the invention, an occurrence of weld as above described is suppressed by shifting the position of the film gate toward the outer peripheral side (in other words, outer circumferential side or radially outer side) of the meshing portion. Furthermore, according to the liner molding die of the invention, it is possible to mold the pressure vessel liner while suppressing an occurrence of weld. Furthermore, since the pressure vessel of the invention includes the pressure vessel liner in which the occurrence of weld is suppressed, it is suitable for the highly pressurized materials being filled.

A method of manufacturing the pressure vessel of the invention will be described below based on the drawings.

BEST MODE FOR CARRYING OUT THE INVENTION

Hereinafter, the pressure vessel of the invention will be described with reference to specific examples.

First Embodiment

Figure 1:
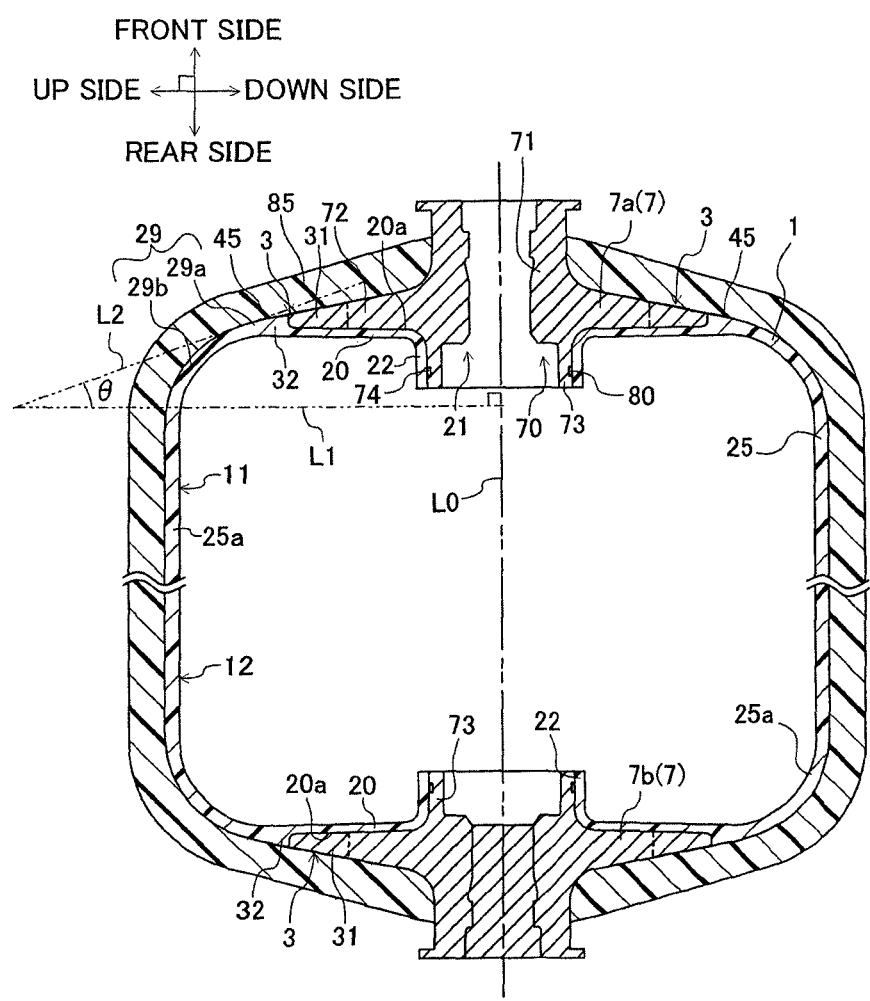
FIG. 1 is a cross-sectional view schematically illustrating a pressure vessel of the first embodiment.
Figure 2:
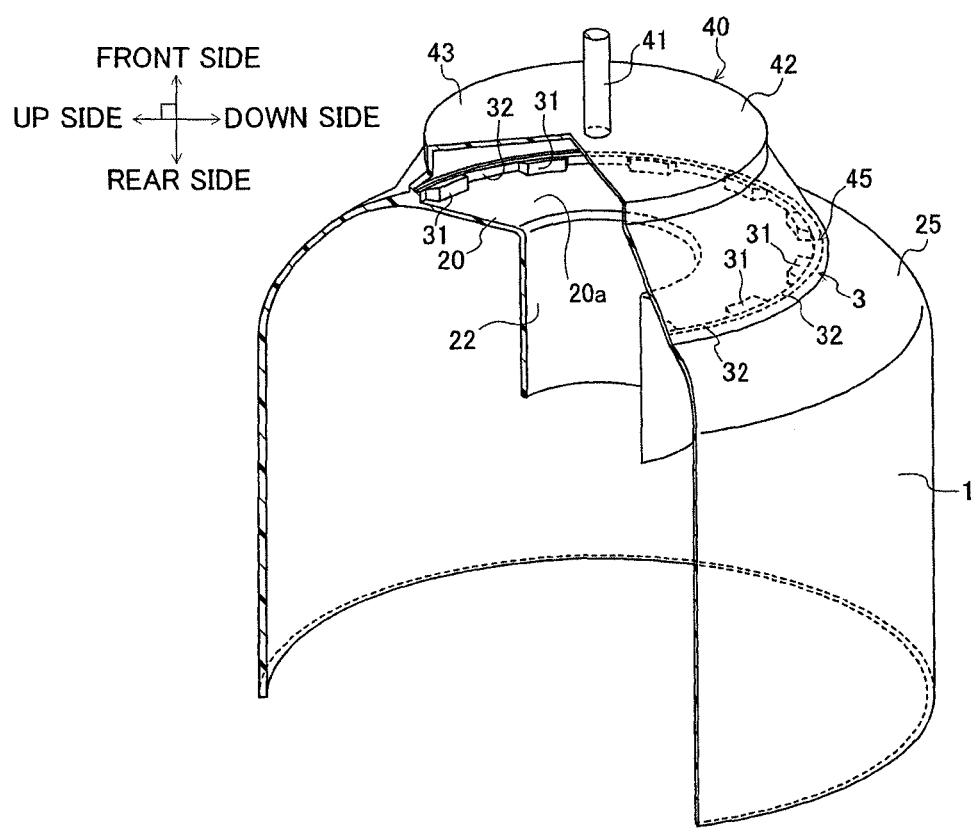
FIG. 2 is a cut-away perspective view schematically illustrating a pressure vessel liner of the first embodiment with a film gate integrated.
Figure 3:
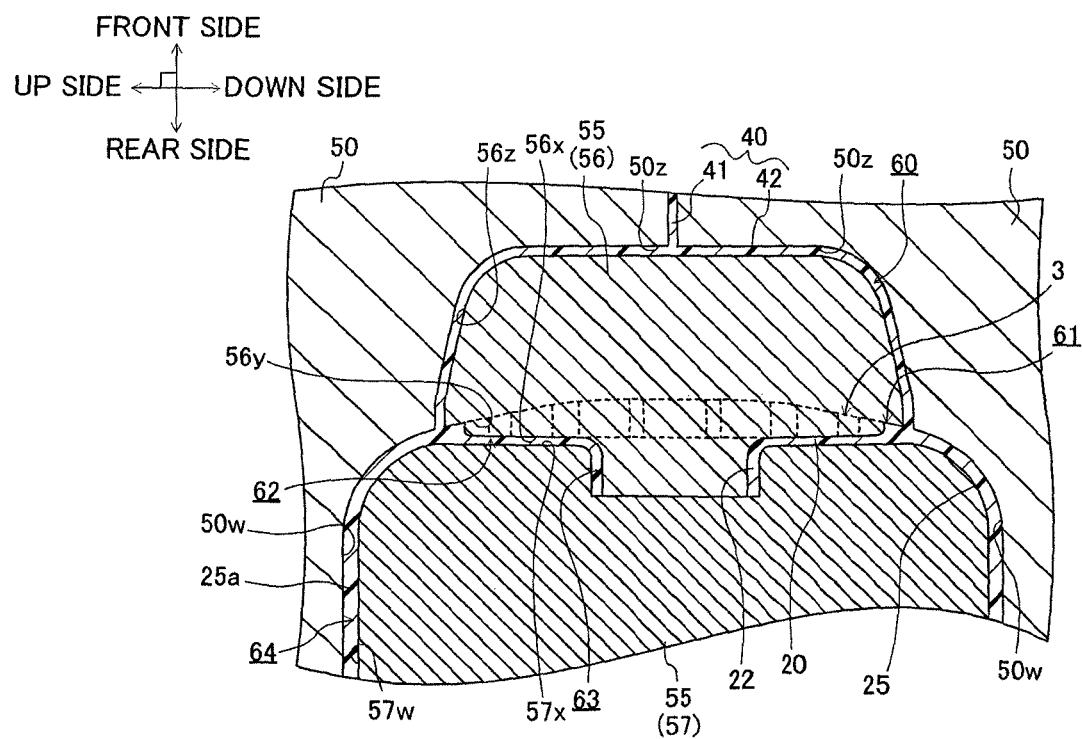
FIG. 3 is an enlarged cross-sectional view of main parts schematically illustrating a molding die of the first embodiment.
Figure 4:
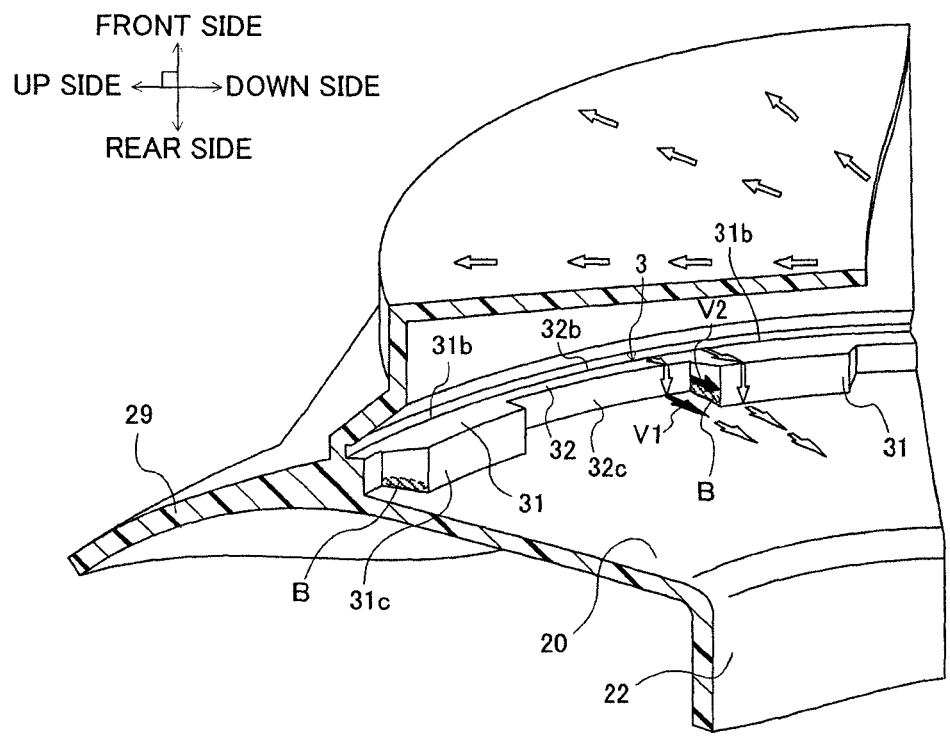
FIG. 4 is an enlarged view of main parts of FIG. 2.
Figure 5:
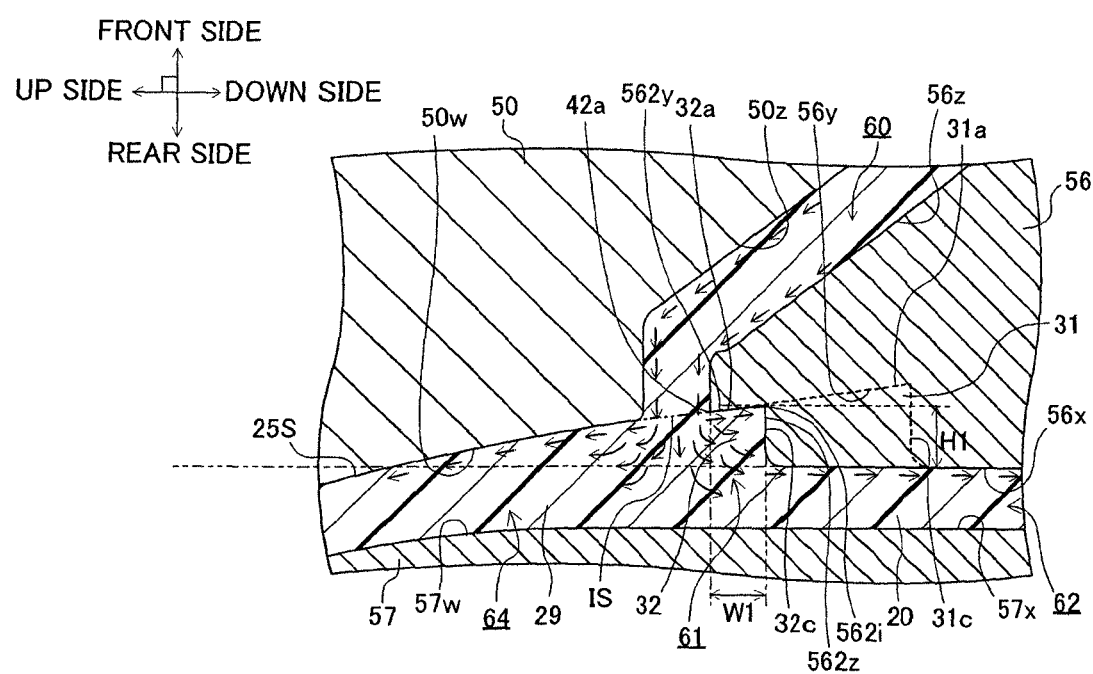
FIG. 5 is an explanatory view schematically illustrating a manner in which the pressure vessel liner of the first embodiment is molded.
Figure 6:
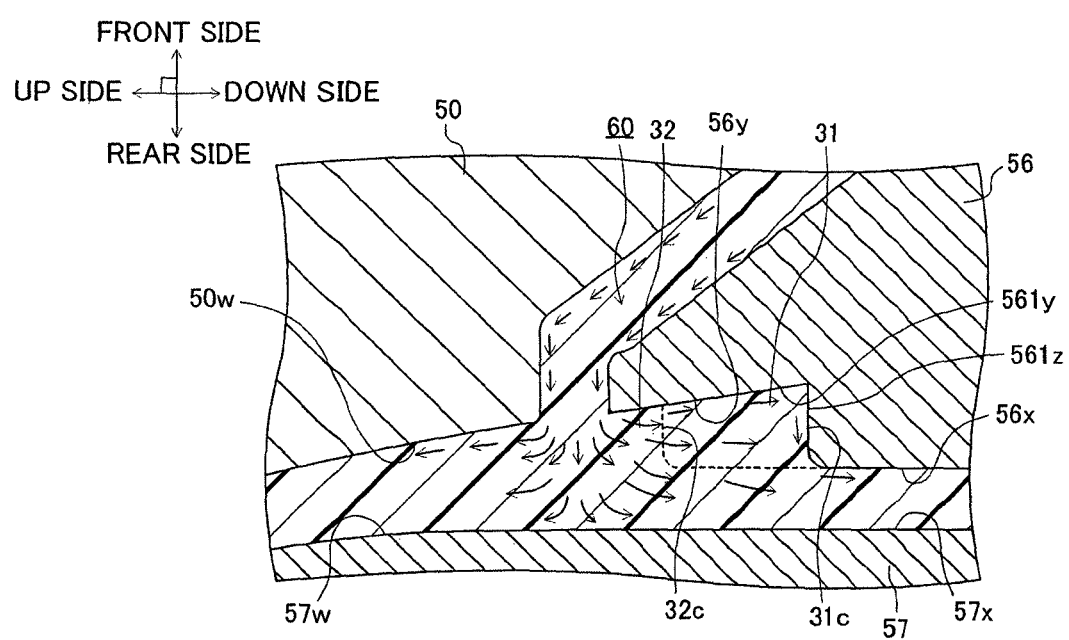
FIG. 6 is an explanatory view schematically illustrating a manner in which the pressure vessel liner of the first embodiment is molded.

The pressure vessel of the first embodiment is an on-vehicle hydrogen fuel tank and is provided with the above-described (1) and (3). FIG. 1 illustrates a cross-sectional view that schematically illustrates the pressure vessel of the first embodiment, and FIGS. 2 and 4 are cut-away perspective views illustrating schematically a pressure vessel liner of the first embodiment with the film gate integrated. FIG. 3 is an enlarged view of main parts schematically illustrating a molding die of the first embodiment, and FIGS. 5 and 6 are explanatory views schematically illustrating a manner in which the molding pressure vessel liner of the first embodiment is molded in the molding die of the first embodiment. Specifically, FIG. 1 is a cross-sectional view schematically illustrating the pressure vessel of the first embodiment in a state cut in an axial direction. FIG. 4 is an enlarged view of the main parts of FIG. 2. FIG. 5 is a cross-sectional view illustrating a manner in which a meshing portion and a bottom portion near a concave portion are molded. FIG. 6 is a cross-sectional view illustrating a manner in which a meshing portion and a bottom portion near a convex portion are molded. Hereinafter, in the embodiments and comparative examples, terms "top side", "bottom side", "front side", and "rear side" respectively refer to "top side", "bottom side", "front side" and "rear side" illustrated in the corresponding drawings. The axial direction is the same direction as a front-rear direction illustrated in the corresponding drawings. A radial direction is a direction perpendicular to the axial direction and is the same direction as a top-bottom direction illustrated in the corresponding drawings. In addition, a mouthpiece, an O-ring, and a pressure vessel, which will be described later, have an identical axial direction and an identical radial direction.

The pressure vessel of the first embodiment is provided with a pressure vessel liner 1, a mouthpiece 7, an O-ring 80, and a reinforcing portion 85. The pressure vessel linear 1 is a bottomed cylindrical shape, and has two axial end portions, each decreasing in diameter in a dome shape and having a substantially central portion depressed toward the axially inner side. Each of the depressed portions constitutes a bottom portion 20. In addition, a dome-shaped portion of the pressure vessel liner 1, i.e., a peripheral edge portion 29 of the bottom portion 20 is smoothly connected to a peripheral wall 25a of a liner main body portion 25 which will be described later.

The pressure vessel liner 1 is obtained by molding two separate partial bodies 11 and 12, the partial body 11 as one axial end portion and the partial body 12 as the other axial end portion, and then integrally welding the two partial bodies 11 and 12 in a substantially axial central area of the linear. An opening 21 as a through hole is formed in a substantially central portion of each bottom portion 20 of the pressure vessel liner 1, and a peripheral edge portion of the opening 21 extends axially inward in a cylindrical shape. In other words, a bottomless opening portion 22 having a substantially cylindrical shape is formed in each of the bottom portions 20. The pressure vessel liner 1 is formed of an ethylene-vinyl alcohol copolymer resin (EVOH) having excellent gas barrier characteristics.

A mouthpiece 7 is attached to each opening portion 22 in the pressure vessel liner 1. More specifically, a mouthpiece 7a with a through hole-shaped mouthpiece opening 70 is attached to one opening portion 22, and a sealed mouthpiece 7b without mouthpiece opening 70 is attached to the other opening portion 22. The mouthpiece 7 is made of metal and has a boss portion 71 and a flange portion 72. The boss portion 71 has a cylindrical shape. In an axially outer portion (front side in FIG. 1) of the inner peripheral surface of the boss portion 71, thread grooves (not illustrated) are formed. The flange portion 72 projects radially outward from the outer peripheral surface of the boss portion 71. In the pressure vessel of the first embodiment, the flange portion 72 has a substantially annular shape continuously along the entire outer periphery of the boss portion 71. A mouthpiece extension portion 73 serving as a rear side portion of the boss portion 71 extends to the rear side beyond the flange portion 72. A valve (not illustrated) is detachably attached to one mouthpiece 7a (the front mouthpiece 7 in FIG. 1).

An O-ring retention groove 74 of an annular groove shape is formed to be depressed on the outer peripheral surface of the mouthpiece extension portion 73. An O-ring 80 made of an elastic material is inserted into the O-ring retention groove 74. The outer peripheral surface of the mouthpiece extension portion 73 is covered with the opening portion 22 as a part of the pressure vessel liner 1.

A reinforcing portion 85 is formed on the outer peripheral side of the pressure vessel liner 1. Specifically, the reinforcing portion 85 is made of FRP including a carbon fiber and an epoxy resin, and is formed by being wound around the outer periphery of the pressure vessel liner 1. That is, the pressure vessel liner 1 covers the inner peripheral surface of the reinforcing portion 85.

The pressure vessel liner 1 includes a bottom portion 20, an opening portion 22, and a liner main body portion 25. As illustrated in FIG. 1, the bottom portion 20 has a substantially disk shape, and covers the bottom surface (i.e., an axial inner surface of the flange portion 72) of the flange portion 72. The opening portion 22 is made up of a peripheral edge portion of the opening 21, and as described above, has a substantially cylindrical shape to cover the outer peripheral surface of the mouthpiece extension portion 73. A liner main body portion 25 is the remaining other portion and has a substantially cylindrical shape. More specifically, in the liner main body portion 25, a substantially central portion in the axial direction has a substantially cylindrical shape, and two axial end portions have a substantially dome shape.

A meshing portion 3 is integrally formed in the axially outer surface 20a of the bottom portion 20. In addition, an axially outer surface 20a of the bottom portion 20 on the front side in FIG. 1 is a front surface, and an axially outer surface 20a of the bottom portion 20 on a rear side in FIG. 1 is a rear surface. As illustrated in FIGS. 1 and 2, the meshing portion 3 includes a plurality of convex portions 31 and a plurality of concave portions 32. More specifically, the concave portions 32 and the convex portions 31 are alternately arranged along a circumferential direction of the pressure vessel. Thus, the meshing portion 3 is disposed coaxially with the opening portion 22 on the radially outer side of the opening portion 22 (i.e., an outer peripheral side of the opening portion 22). In addition, the axially outer surface 20a of the bottom portion 20 is disposed on an axially inner side of the axially outer surface 31a of the convex portion 31 and the axially outer surface 32a of the concave portion 32. Furthermore, the bottom portion 20 is thinner than the liner main body portion 25.

Each of the convex portions 31 has a substantially rectangular shape, projects (bulges)) axially outward from the axially outer surface 20a of the bottom portion 20, and projects radially inward from the radially outer side, that is, toward the opening portion 22 side. Each of the concave portions 32 also has a substantially rectangular shape, projects axially outward from the axially outer surface 20a of the bottom portion 20, and projects radially inward from the radially outer side. Each concave portion 32 connects the adjacent two convex portions 31. A projection height of each convex portion 31 and each concave portion 32 represents a protrusion height from the axially outer surface 20a of the bottom portion 20.

As illustrated in FIGS. 2 and 4, the meshing portion 3 smoothly continues along the circumferential direction of the pressure vessel on the radially outer side (outer peripheral side). Furthermore, the meshing portion 3 has a dentition shape in which the convex portions 31 protrude radially inward and the concave portions 32 withdraw radially outward on the radially inner side (the inner peripheral side). That is, the outer peripheral surface of the meshing portion 3 has a circular arc shape, and the inner peripheral surface of the meshing portion 3 has a stepped shape. Thus, a projection length from the outer peripheral end portion of each concave portion 32 to the radially inner side (in other words, a radial length of each concave portion 32 from the outer peripheral surface of the concave portion 32) is shorter than the projection length of the convex portion 31 (in other words, a radial length of each convex portion 31 from the outer peripheral surface of the convex portion 31).

As illustrated in FIGS. 5 and 6, the axially outer surface 31a of the convex portion 31 and the axially outer surface 32a of the concave portion 32 smoothly continue. Furthermore, as illustrated in FIG. 4, the radially outer end portion 31b of the convex portion 31 and the radially outer end portion 32b of the concave portion 32 smoothly continue. Therefore, the meshing portion 3 has a substantially disk shape as a whole. In addition, the radially outer end portion 31b of the convex portion 31 and the radially outer end portion 32b of the concave portion 32 continue in the circumferential direction of the pressure vessel. The radially outer end portion 31b and the radially outer end portion 32b correspond to the outer peripheral end portion of the invention. Moreover, the length of the convex portion 31 projecting inward in the radial direction represents to a radial length of the convex portion 31 from the outer peripheral surface of the convex portion 31 (i.e., the radially outer end portion 31b). Furthermore, the length of the concave portion 32 projecting inward in the radial direction represents a radial length of the concave portion 32 from the outer peripheral surface of the concave portion 32 (i.e., the radially outer end portion 32b). The length of each concave portion 32 projecting inward in the radial direction is shorter than the projection length of each convex portion 31.

As illustrated in FIGS. 5 and 6, heights of the convex portion 31 and the concave portion 32 projecting outward in the axial direction gradually increase toward the radially inner side from the radially outer side.

In addition, on the bottom surface (i.e., a surface facing the meshing portion 3) of the flange portion 72 in the mouthpiece 7, a mouthpiece side meshing portion (not illustrated) is formed to have a concave-convex shape complementary to the meshing portion 3. The meshing portion 3 is meshed with the mouthpiece side meshing portion, thereby restricting the rotation of the mouthpiece 7 with respect to the pressure vessel liner 1.

As illustrated in FIGS. 2 and 3, the gate 40 includes a gate port 41 and a film gate 42. The gate port 41 extends in the axial direction and the film gate 42 continues to the gate port 41. The film gate 42 has a substantially dome shape in which a lid wall 43 faces the front side and increases in diameter toward the rear side. The rear end portion of the film gate 42 is open and is integrated with the liner main body portion 25. More specifically, the rear end portion of the film gate 42 has a substantially ring shape and is integrated with the liner main body portion 25 on the outer peripheral side of the meshing portion 3 in the pressure vessel liner 1. The film gate 42 and the liner main body portion 25 are connected to each other in a stepped shape.

As will be described later, on the radially outer side of the outer peripheral end portion of the meshing portion 3, a gate portion 45 having a substantially annular shape is formed. The gate portion 45 is a trace of the film gate 42 formed during molding. The film gate 42 is removed by excision, polishing or the like after molding, but the trace thereof remains on the pressure vessel liner 1 in a convex shape and/or a concave shape.

A method of manufacturing the pressure vessel liner 1 of the first embodiment will now be described.

As the molding die, as illustrated in FIG. 3, an injection molding die having an outer die 50 and two inner dies 55 (a first inner die 56 and a second inner die 57) is used. A cavity (referred to as a gate cavity 60) for molding the gate 40 is defined by the outer die 50 and the first inner die 56. For the die surfaces of the outer die 50 and the die surfaces of the first inner die 56, their respective portions defining the gate cavity 60 are referred to as gate die surfaces 50z and 56z.

Furthermore, a cavity for molding the meshing portion 3 (referred to as a meshing portion cavity 61), a cavity for molding the bottom portion 20 of the pressure vessel liner 1 (referred to as a bottom portion cavity 62), and a cavity for molding the opening portion 22 (referred to as an opening portion cavity 63) are defined by the first inner die 56 and the second inner die 57. For the die surfaces of the first inner die 56, a portion defining the meshing portion cavity 61 is referred to as an meshing portion die surface 56y, and a portion defining the bottom portion cavity 62 is referred to as a bottom portion die surface 56x. For the die surfaces of the second inner die 57, a portion defining the bottom portion cavity 62 is referred to as a bottom portion die surface 57x. For the meshing portion die surface 56y, a region for molding the concave portion 32 is referred to as a concave portion molding region 562y, and for the meshing portion die surface 56y, a region for molding the convex portion 31 is referred to as a convex portion molding region 561y.

Furthermore, a cavity (referred to as a liner cavity 64) for molding the liner main body portion 25 is defined by the outer die 50 and the second inner die 57. For the die surfaces of the outer die 50 and the die surfaces of the second inner die 57, portions defining the liner cavity 64 are referred to as liner die surfaces 50w and 57w.

The injection molding die including the first inner die 56, the second inner die 57, and the outer die 50 is clamped to form the gate cavity 60, the meshing portion cavity 61, the bottom portion cavity 62, and the liner cavity 64. Moreover, molten resin is injected into the gate cavity 60. Then, the molten resin first spreads radially in the gate cavity 60, then flows rearward from the front, and flows into a boundary portion among the liner cavity 64, the meshing portion cavity 61, and the bottom portion cavity 62. At this time, as illustrated in FIGS. 5 and 6, a part of the molten resin flowing into the liner cavity 64 flows along the liner die surfaces 50w and 57w.

Meanwhile, when the molten resin hits the die surface of the molding die, the flow rate thereof decreases. Moreover, the flow rate of the once decreased molten resin is hard to rise again. In the first example, as illustrated in FIGS. 4 to 6, the gate 40 is disposed on the outer peripheral side of the meshing portion 3. In other words, the region 561z for molding the inner peripheral end surface 31c of the convex portion 31 and the region 562z for molding the inner peripheral end surface 32c of the concave portion 32 in the meshing portion die surface 56y are offset to the inner peripheral side of the gate die surface 56z. Therefore, the molten resin flows along the axial direction (front-rear direction in the figures) of the gate cavity 60 and flows into the meshing portion cavity 61 from the gate cavity 60. As a result, the molten resin is less subjected to interference of the region 561z and the region 562z, and can spread outward and inward (to the up side and down side in the figures) in the radial direction of the meshing portion cavity 61. That is, a part or most of the molten resin changes the flow direction without hitting the die surface at this time. Therefore, the flow rate of the molten resin is less likely to decrease at this time. Thereafter, the molten resin flows into the bottom portion cavity 62 having a narrower width than the meshing portion cavity 61 and the liner cavity 64. However, as described above, since the flow direction of a part of the molten resin already has changed in the radial direction, a decrease in the flow rate during flowing into the bottom portion cavity 62 from the liner cavity 64 is also small. Therefore, there is no great difference in a flow rate between the molten resin (indicated by arrow V1 in FIG. 4) flowing along the concave portion molding region 562y into the bottom portion cavity 62 from the meshing portion cavity 61 and the molten resin (indicated by arrow V2 in FIG. 4) flowing through the meshing portion cavity 61 along the convex portion molding region 561y. That is, the flow rate difference between V1 and V2 is small, and an occurrence of weld in a boundary portion B between V1 and V2 is suppressed.

Incidentally, as illustrated in FIG. 5, a radial length from the gate die surfaces 50z and 56z to the inner peripheral end portion 562i of the concave portion molding region 562y (in other words, a distance between the gate die surface 56z and the inner peripheral end portion 562i of the concave portion molding region 562y) is set to W1. Furthermore, an axial length of the region for molding the inner peripheral end surface 32c of the concave portion 32 in the concave portion molding region 562y (i.e., an axial length of the inner peripheral end portion 562i in the concave portion molding region 562y) is set to H1. In the first embodiment, the radial length W1 is equal to or greater than the axial length H1. Therefore, in the molding die of the first embodiment, the molten resin hits the die surfaces (that is, the region 561z and the region 562z) after sufficiently having spread in the radial direction. That is, in the molding die of the first embodiment, by setting the radial length W1 to be equal to or greater than the axial length H1, it is possible to suppress a decrease in the flow rate of the molten resin, and as a result, it is possible to suppress an occurrence of weld. The radial length W1 is required only to be equal to or greater than the axial length H1, but more preferably is a predetermined length or more. In the molding die of the first embodiment, since the axial length H1 is 5 mm and the radial length W1 is also 5 mm, the radial length W1 is equal to or greater than the axial length H1. For this reason, is possible to suppress an occurrence of weld in the molding die of the first embodiment.

Furthermore, in the pressure vessel liner 1 of the first embodiment molded using the molding die of the first embodiment, the radial length W1 from the gate portion 45 to the inner peripheral end portion (inner peripheral end surface 32c) of the concave portion 32 is equal to or greater than the axial length H1 of the inner peripheral end surface of the concave portion 32, and the radial length from the gate portion 45 to the inner peripheral end surface 32c of the concave portion 32 is 5 mm. Therefore, similarly in the pressure vessel liner 1, the radial length W1 is required only to be equal to or greater than the axial length H1, and the radial length W1 is more preferably at least 5 mm or more. The radial length W1 is required only to be 5 mm or more, and there is no particular upper limit in terms of suppressing an occurrence of weld. However, strictly speaking, it is preferred to provide the film gate 42 in the peripheral edge portion 29 of the bottom portion 20. Specifically, the radial length W1 is preferably is 5 mm or more and 50 mm or less, and is more preferably 5 mm or more and 25 mm or less. These are the upper limits of W1 in consideration of the manufacturing process of the pressure vessel.

That is, the dome-shaped portion in the pressure vessel liner 1, that is, the peripheral edge portion 29 of the bottom portion 20 is thicker than other portions. In general, the pressure vessel liner 1 becomes gradually thinner toward the peripheral wall 25a of the liner main body portion 25 from the peripheral edge portion 29. Moreover, in the peripheral wall 25a, the thickness of the pressure vessel liner 1 is substantially constant. In consideration of removing the film gate 42 from the pressure vessel liner 1 by cutting, grinding or the like after molding, it is preferred that the thick portion be provided in the film gate 42 from the viewpoint of ease of cutting and strength. As an example, when the peripheral edge portion 29 of the bottom portion 20 in the pressure vessel liner 1 is divided into a portion continuous to the radially outer side of the bottom portion 20 (referred to as a thick portion 29a) and an inflection portion connecting the thick portion 29a and the peripheral wall 25a (referred to as a shoulder portion 29b), it is preferred that the film gate 42 be provided in the thick portion 29a.

Here, the shoulder portion 29b as the inflection portion includes a portion having a greater curvature than the thick portion 29a. In other words, as illustrated in FIG. 1, in the axial cross-section of the pressure vessel, a region in which an intersection angle θ between a straight line L1 intersecting perpendicularly to an axis L0 of the pressure vessel and a tangential line L2 on the surface of the pressure vessel liner 1 is greater than 20° and less than 90° may be defined as a shoulder portion 29b, and a region in which the intersection angle θ is 0° or more and 20° or less may be defined as a thick portion 29a. The intersection angle θ is a minor angle.

In another viewpoint, the diameter of the pressure vessel of the first embodiment is approximately 300 to 400 mm, and the upper limit of the radial length W1 is related to the diameter of the pressure vessel. When the diameter of the pressure vessel is approximately 400 mm, by setting W1 to 50 mm or less, it is possible to provide the film gate 42 in the thick portion of the peripheral edge portion 29, that is, in the thick portion 29a. Furthermore, when the diameter of the pressure vessel is approximately 300 mm, by setting W1 to 25 mm or less, it is possible to provide the film gate 42 in the thick portion 29a.

Furthermore, the thick peripheral edge portion 29 is preferable to be close to the film gate 42 as much as possible and it is particularly preferred to provide the peripheral edge portion 29 immediately below the film gate 42, in consideration of moldability of the pressure vessel liner 1. The purpose of this is to allow the molten resin to reach the cavity during molding at as high temperature as possible by bringing a cavity for molding the thick portion, i.e., the peripheral edge portion 29 close to the film gate 42, thereby ensuring sufficient fluidity of resin. In view of the above, the gate portion 45 is preferably provided in the thick portion 29a, and specifically, the radial length W1 from the gate portion 45 to the inner peripheral end portion of the concave portion 32 is preferable to be as short as possible within a range of 5 mm or more and 50 mm or less. For reference, the inner peripheral end 42a of the boundary portion between the film gate 42 and the peripheral edge portion 29 is provided on the axially outer side (front side in FIG. 5) of the axially outer surface 20a of the bottom portion 20. In addition, in the embodiment, the position of the film gate 42 is on the axially outer side (front side in FIG. 1) relative to the bottom portion 20.

After molding, by opening the molding die to take out a molded article and removing the gate 40 by known methods such as cutting and grinding, the pressure vessel liner 1 of the first embodiment is obtained. The gate portion 45 of the pressure vessel liner 1 is relatively smooth. That is, an occurrence of burr is suppressed in the pressure vessel liner 1 of the first embodiment. This is considered to be caused due to the fact that the gate portion 45 is offset to the outer peripheral side of the meshing portion 3 to be spaced apart from the inner peripheral end surface 32c of the concave portion 32 and the inner peripheral end surface 31c of the convex portion 31. In other words, in the pressure vessel liner 1 of the first embodiment, since the gate portion 45 is formed on a relatively flat surface, an occurrence of burr (especially, burr of a filamentous shape) is suppressed. That is, when the gate portion 45 is located, for example, in the vicinity of the inner peripheral end surface of the concave portion 32, at the time of cutting and/or polishing of the film gate 42, the inner peripheral end surface 32c of the concave portion 32 is cut together with the film gate 42. Therefore, in this case, the filamentous burrs easily occur in the boundary between the inner peripheral end surface 32c and the axially outer surface 32a in the concave portion 32, that is, in the corners. In the pressure vessel liner 1 of the first embodiment, by disposing the gate portion 45 at a position shifted to the outer peripheral side from the inner peripheral end surface 32c of the concave portion 32, the inner peripheral end surface 32c of the concave portion 32 and the inner peripheral end surface 31c of the convex portion 31 are hardly polished and/or cut. Furthermore, since the gate portion 45 itself is disposed on the relatively flat surface, even in polishing and/or cutting the gate 40 itself, burrs are hard to occur. Thus, since the pressure vessel liner 1 of the first embodiment has the relatively smooth outer surface and stress is hard to concentrate after molding of the reinforcing portion 85, it is suitable for the pressurized materials of relatively high pressure to be filled in. Furthermore, according to the molding die of the first embodiment, it is possible to easily manufacture the pressure vessel liner 1 suitable for the pressurized materials of relatively high pressure to be filled in.

In addition, in the pressure vessel liner 1 of the first embodiment, as illustrated in FIG. 5, a virtual curved surface IS indicated by broken lines in FIG. 5 is substantially flush with the gate portion 45. The virtual curved surface IS used here refers to a virtual curved surface that smoothly connects the axially outer end surface of the convex portion 31 (i.e., the axially outer surface 31a) and the outer surface 25s in the peripheral wall of the liner main body portion 25. If the virtual curved surface IS is substantially flush with the gate portion 45, the stress concentration to the pressure vessel liner 1 is suppressed as described above.

Thereafter, the mouthpiece 7 equipped with an O-ring 80 is inserted into the opening portion 22 of the pressure vessel liner 1. Finally, the reinforcing portion 85 is formed by being wound. By the above-mentioned processes, the pressure vessel of the first embodiment including the pressure vessel liner 1, the mouthpiece 7, the O-ring 80, and the reinforcing portion 85 is obtained as illustrated in FIG. 1.

Although the liner in the pressure vessel of the first embodiment is formed of EVOH, the material of the liner in the pressure vessel of the invention may be suitably selected in accordance with the pressurized materials to be filled. For example, polyphenylene sulfide (PPS), polyethylene, nylon and the like are preferably used as the materials of the liner.

Although the reinforcing portion 85 in the pressure vessel of the first embodiment is formed of FRP containing a carbon fiber and an epoxy resin, glass fibers, aramid fibers and the like may be used in place of the carbon fiber.

Comparative Example

Figure 7:
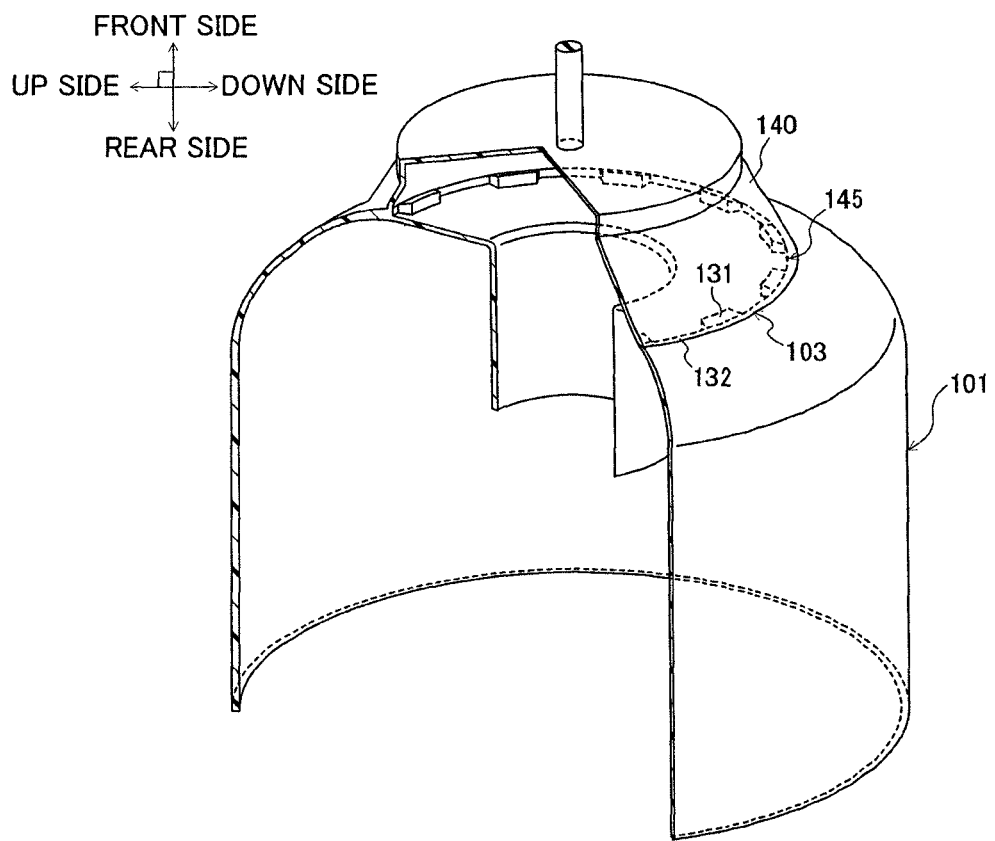
FIG. 7 is a cut-away perspective view schematically illustrating a pressure vessel liner of a comparative example with a film gate integrated.
Figure 8:
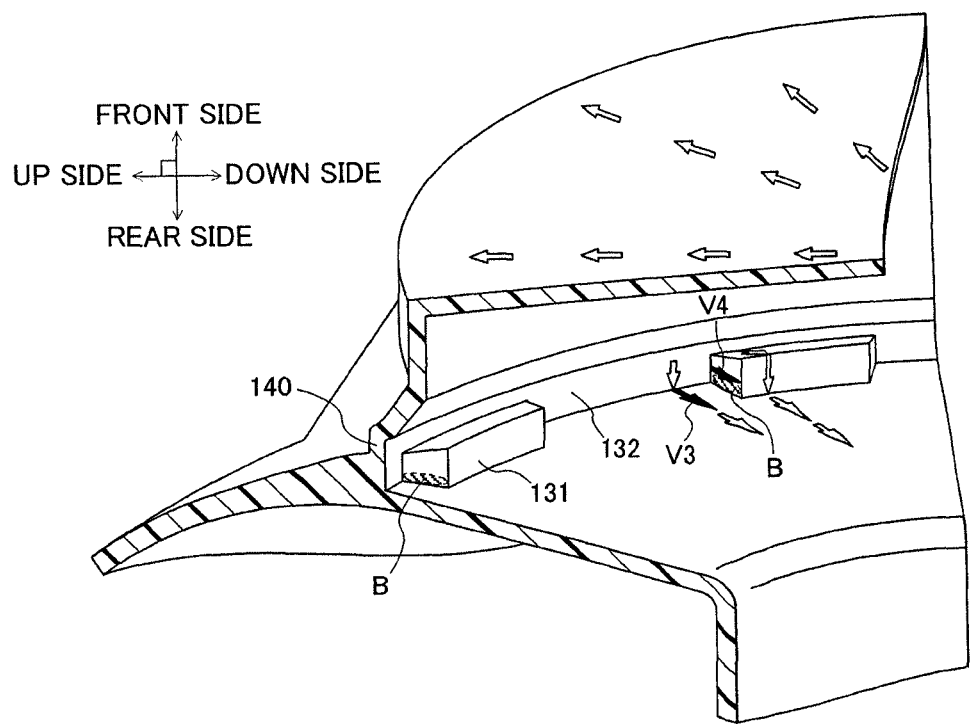
FIG. 8 is an enlarged view of main parts of FIG. 7.
Figure 9:
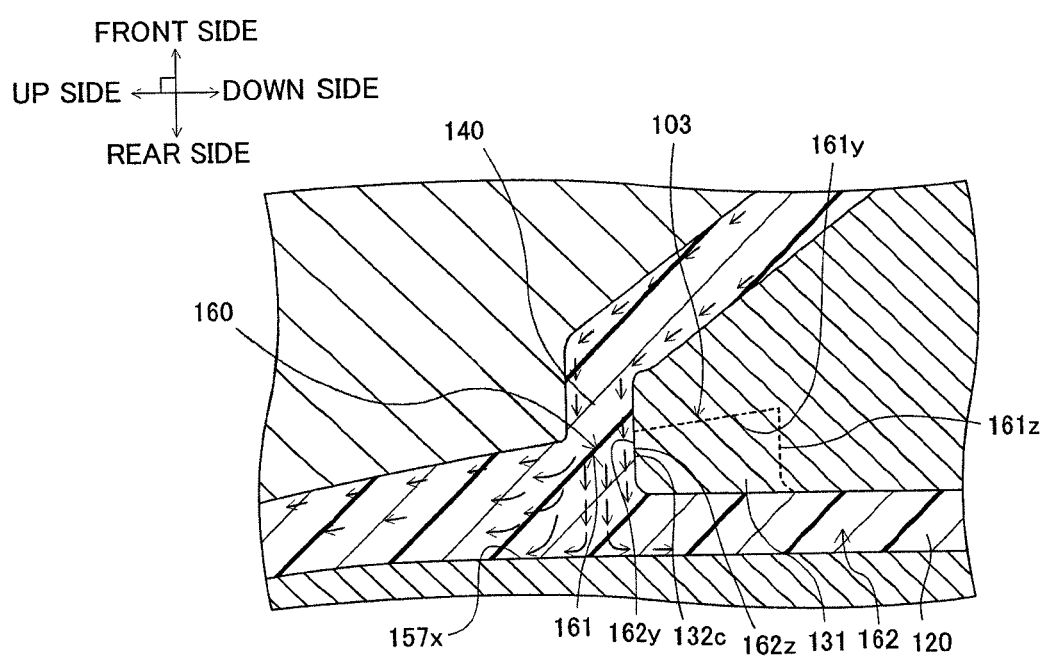
FIG. 9 is an explanatory view schematically illustrating a manner in which the pressure vessel liner of the comparative example is molded.
Figure 10:
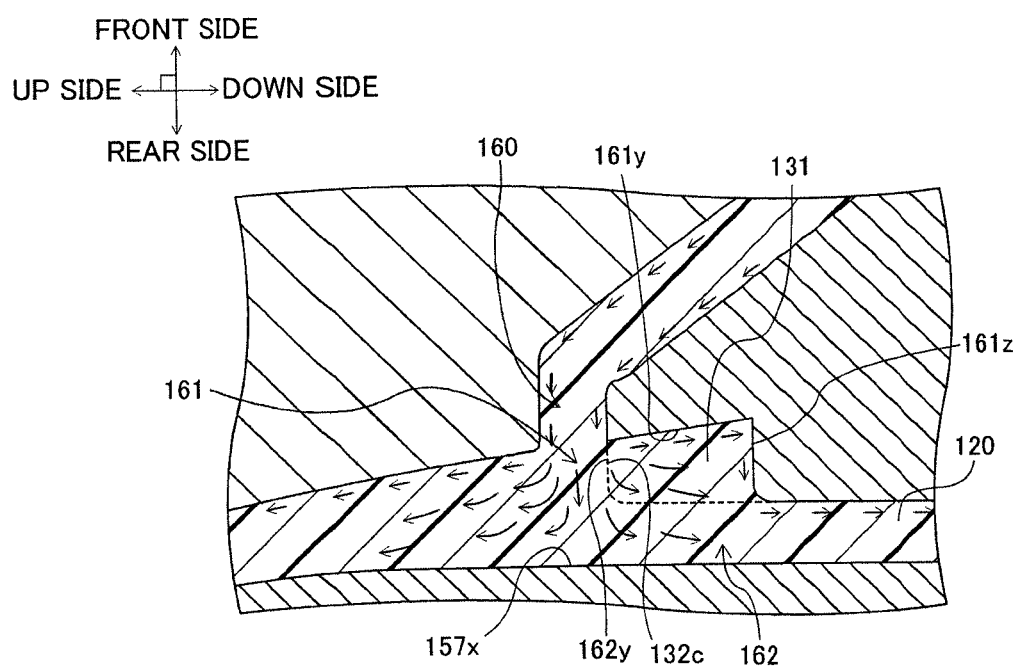
FIG. 10 is an explanatory view schematically illustrating a manner in which the pressure vessel liner of the comparative example is molded.

A comparative example includes a comparative pressure vessel liner, in which the gate portion is adjacent to the inner peripheral end surface of the concave portion of the meshing portion. FIGS. 7 and 8 are cut-away perspective views schematically illustrating a pressure vessel liner of the comparative example, and FIGS. 9 and 10 are explanatory views schematically illustrating a manner in which the pressure vessel liner of the comparative example is molded. In addition, FIG. 8 is an enlarged view of main parts of FIG. 7. Furthermore, FIG. 9 is a cross-sectional view illustrating the meshing portion and the bottom portion in the vicinity of the concave portion. FIG. 10 is a cross-sectional view illustrating the meshing portion and the bottom portion located the vicinity of the convex portion.

A pressure vessel liner 101 of the comparative example is substantially the same as the pressure vessel liner 1 of the first embodiment, except for a positional relation between a gate portion 145 and a meshing portion 103. Specifically, as illustrated in FIGS. 9 and 10, a gate 140 is located directly above a concave portion 132 of the meshing portion 103, and an inner peripheral end surface 132c of the concave portion 132 and the gate 140 are located at substantially the same position in the radial direction. Thus, the gate portion 145 is also located directly above the concave portion 132 of the meshing portion 103, and the inner peripheral end surface 132c of the concave portion 132 and the gate portion 145 are formed at substantially the same position in the radial direction.

Therefore, as illustrated in FIGS. 9 and 10, when manufacturing the pressure vessel liner 101 of the comparative example, the molten resin flows along a concave portion molding region 162y, and thereby slows down at the beginning of the flow.

More specifically, in regard to the molten resin flowing along a convex portion molding region 161y, when flowing into the meshing portion cavity 161 from the gate cavity 160, the molten resin spreads in the radial direction. That is, in regard to the molten resin flowing along the convex portion molding region 161y, the flow direction changes in the radial direction without substantially being subjected to the interference of the die surface (i.e., a region 161z). For this reason, a decrease in the flow rate of the molten resin is suppressed. Meanwhile, in regard to the molten resin flowing along the concave portion molding region 162y, when flowing into the meshing portion cavity 161 from the gate cavity 160, the molten resin is guided in an axial direction (in a rear direction in the drawings) along the die surface (i.e., a region 162z). At this stage, there is almost no decrease in the flow rate of the molten resin. Thereafter, the molten resin further flows in the axial direction, and hits against a bottom portion die surface 157x. For this reason, the flow rate of the molten resin greatly decreases. Furthermore, also when the molten resin flows into the narrow bottom portion cavity 162 from the meshing portion cavity 161, the flow rate of the molten resin greatly decreases. Therefore, a large difference occurs in a flow rate between the molten resin (indicated by arrow V3 in FIG. 8) which flows along the concave portion molding region 162y into the bottom portion cavity 162 from the meshing portion cavity 161, and the molten resin (indicated by arrow V4 in FIG. 8) which flows through the meshing portion cavity 161 along the convex portion molding region 161y. In other words, it is considered that as there is a large difference in a flow rate between V3 and V4, weld occurs in the boundary portion B between V3 and V4.

Furthermore, as illustrated in FIG. 9, the gate 140 is located directly above the concave portion 132, and a distance from the gate portion 145 to the inner peripheral end portion (inner peripheral end surface 132c) of the concave portion 132 is substantially zero. For this reason, in the case of manufacturing the pressure vessel liner 101 of the comparative example, when cutting and/or polishing the gate 140 to form the gate portion 145, filamentous burrs easily occur.

Second Embodiment 2

Figure 11:
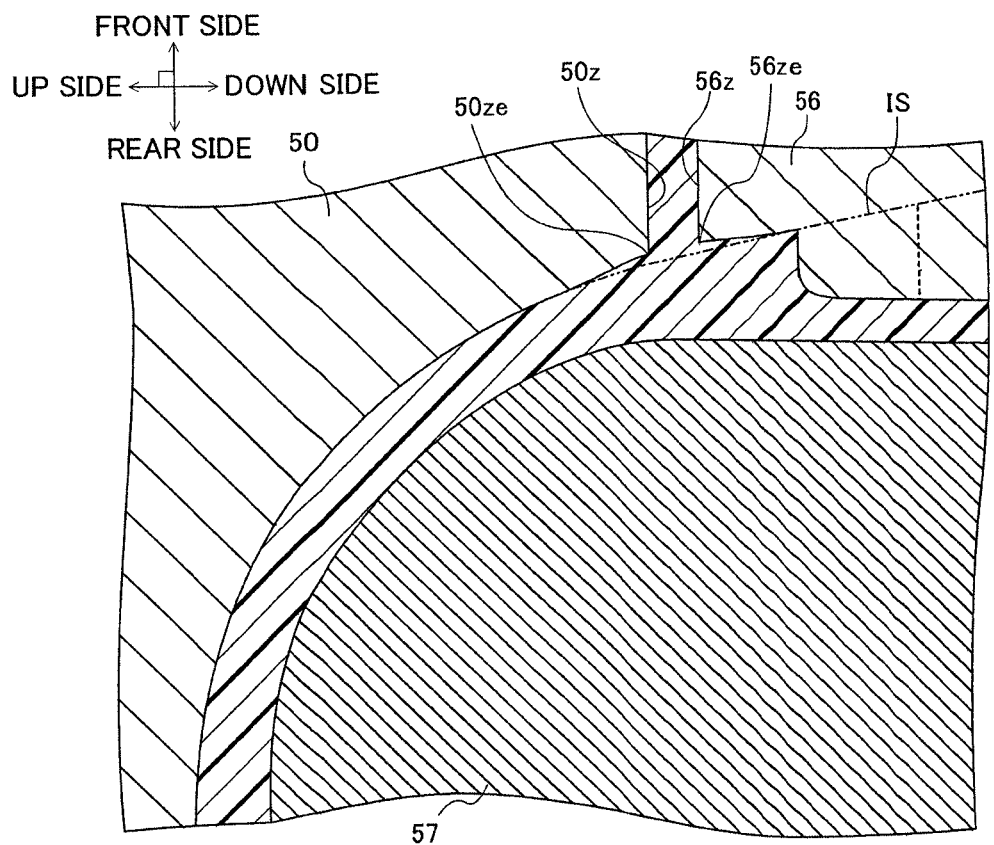
FIG. 11 is an enlarged cross-sectional view of main parts schematically illustrating a molding die of the second embodiment.
Figure 12:
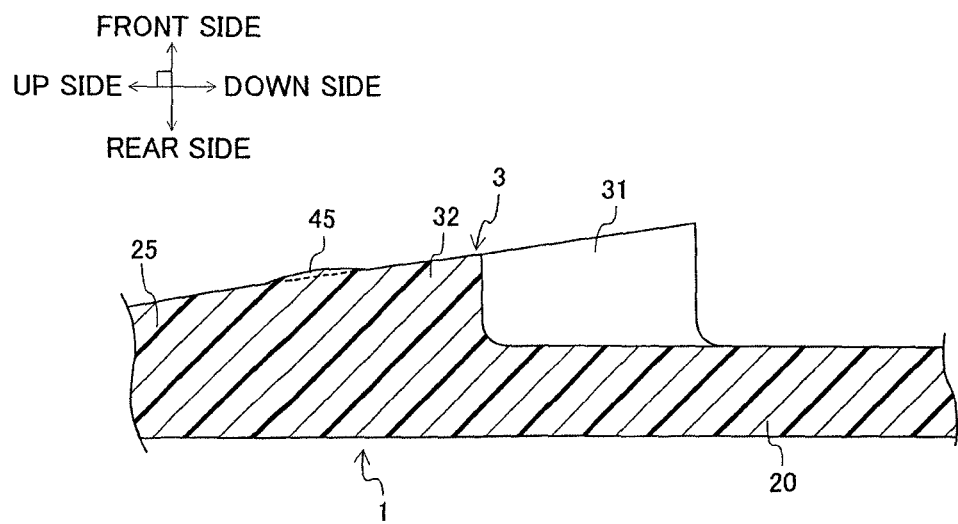
FIG. 12 is an explanatory view schematically illustrating a pressure vessel liner of the second embodiment.

A pressure vessel liner of a second embodiment is provided with the above-described (1) and (2). FIG. 11 is an enlarged cross-sectional view of main parts schematically illustrating a liner molding die of the second embodiment. FIG. 12 is an enlarged cross-sectional view of main parts schematically illustrating a pressure vessel liner of the second embodiment.

As illustrated in FIG. 11, in the liner molding die of the second embodiment, regions (50ze and 56ze in FIG. 11) for molding a proximal end portion of a gate portion 45 in gate die surfaces (50z and 56z in FIG. 11) and a virtual curved surface IS are spaced apart from each other in a thickness direction of the cavity (that is, a thickness direction of the pressure vessel liner 1), and a distance thereof is about 0.5 mm. A pressure vessel liner 1 of the second embodiment molded in the molding die of the second embodiment is substantially the same as that in the first embodiment, except for a positional relation between the virtual curved surface IS and the gate portion 45. Specifically, the end surface of the outer side (a surface side of the pressure vessel) in the gate portion 45 is raised with respect to the virtual curved surface IS.

According to the liner molding die of the second embodiment, there is an advantage in that, in removing a gate 40 from the pressure vessel liner 1, that is, at the time of cutting and/or polishing, even if a portion of the pressure vessel liner 1 in the vicinity of the gate 40 is overcut, a sufficient thickness of the pressure vessel liner 1 can be secured. In addition, the above-described regions (50*ze* and 56*ze* in FIG. 11) for molding the proximal end portion of the gate portion 45 and the virtual curved surface IS are required only to be spaced apart from each other in the thickness direction of the cavity, and the spaced distance thereof is preferably greater than 0 mm and equal to or less than 1 mm.

INDUSTRIAL APPLICABILITY

The pressure vessel of the invention can be preferably used, for example, as a pressure vessel in which the various liquefied gases such as hydrogen gas, CNG, LNG, and LPG are filled. The pressure vessel is particularly preferable for use as an on-vehicle pressure vessel.

OTHERS

The invention is not limited to only the embodiments described above and illustrated in the drawings, and can be carried out by being appropriately modified within the scope of the invention.

The invention claimed is:

1. A pressure vessel liner comprising:
   a resin liner main body portion having a bottomed cylindrical shape and including two axial end portions, each axial end portion having a disk-shaped bottom portion and at least one disk-shaped bottom portion has an opening portion configured to receive a mouthpiece;
   a meshing portion integrally formed on an axially outer surface of each disk-shaped bottom portion and disposed on an outer peripheral side of the opening portion, the meshing portion extending along the axial outer surface of the disk-shaped bottom portion and including convex and concave portions extending in radial directions between an axially outer side and a radially inner side of the liner main body portion, and the concave portions and the convex portions are connected together; and
   a gate portion has a radially inner side disposed on an outer peripheral side of the meshing portion, the gate portion including a trace film formed during molding, wherein:
   in the resin liner main body portion,
      each disk-shaped bottom portion has a peripheral edge portion connected to a peripheral wall of the liner main body portion, and the peripheral edge portion of the disk-shaped bottom portion and the peripheral wall portion of the liner main body portion are joined together into a dome shape; and
      each disk-shaped the bottom portion is depressed axially inward with respect to each peripheral edge portion; and
   in the meshing portion,
      the convex portions and the concave portions are alternately arranged along a circumferential direction of the liner main body portion,
      each convex portion and each concave portion includes an outer end portion, and the radially outer end portions of the convex portions and concave portions are joined together and constitute an outer peripheral end portion continued in the circumferential direction, and
      a projection length from the outer peripheral end portion to the radially inner side of the concave portions is shorter than a projection length from the outer peripheral end portion to the radially inner side of the convex portions.

2. The pressure vessel liner according to claim 1, wherein a radial length from the gate portion to an inner peripheral end portion of the concave portion is equal to or greater than an axial length of the inner peripheral end surface of the concave portion.

3. The pressure vessel liner according to claim 1, wherein a radial length from the gate portion to an inner peripheral end portion of the concave portion is 5 mm or more.

4. The pressure vessel liner according to claim 1, wherein at least a part of the gate portion is raised and corresponds to a curved surface that smoothly connects an axially outer end surface of the convex portion and an outer surface of the peripheral wall of the liner main body portion.

5. The pressure vessel liner according to claim 1, wherein at least a part of the gate portion is flush with a corresponding curved surface that smoothly connects the axially outer end surface of the convex portion and the outer surface of the peripheral wall of the liner main body portion.

6. A molding die for molding the pressure vessel liner according to claim 1, comprising:
   a liner die surface configured to define a cavity for molding the pressure vessel liner, and a gate die surface configured to define a cavity for molding the film gate,
   wherein the gate die surface is disposed on the radially outer side of a region for molding an outer peripheral end portion of the meshing portion on the liner die surface.

7. The liner molding die according to claim 6, wherein a radial length from the gate die surface to a region for molding an inner peripheral end portion of the concave portion on the liner die surface is equal to or greater than an axial length of the region for molding the inner peripheral end surface of the concave portion.

8. The liner molding die according to claim 6, wherein the radial length from the gate die surface to the region for molding the inner peripheral end portion of the concave portion on the liner die surface is 5 mm or more.

9. The liner molding die according to claim 6, wherein a distance between a virtual curved surface and a region for molding a proximal end portion of the gate portion in the gate die surface is greater than 0 mm and equal to or less than 1 mm, the virtual curved surface smoothly connecting a region for molding an axial outer end surface of the convex portion in the liner die surface and a region for molding an outer surface of the peripheral wall of the liner main body portion in the liner die surface.

10. A pressure vessel comprising: the pressure vessel liner according to claim 1, and a mouthpiece of a cylindrical shape that is inserted into the opening portion of the pressure vessel liner and is meshed with the meshing portion.

11. The pressure vessel liner according to claim 1, wherein the film gate is provided in a thick portion of the resin liner main body portion that is connected to the radially outer side of the bottom portion.

12. The pressure vessel liner according to claim 11, wherein a shoulder portion connecting the thick portion and a peripheral wall of the liner main body portion becomes gradually thinner toward the peripheral wall from the thick portion.

13. The pressure vessel liner according to claim 1, wherein the film gate is provided on the axially outer side of the resin liner main body relative to the bottom portion.

* * * * *